H. T. CRONK.
RAILROAD CLOSET SANITATION.
APPLICATION FILED JUNE 7, 1912.
1,097,003.
Patented May 19, 1914.
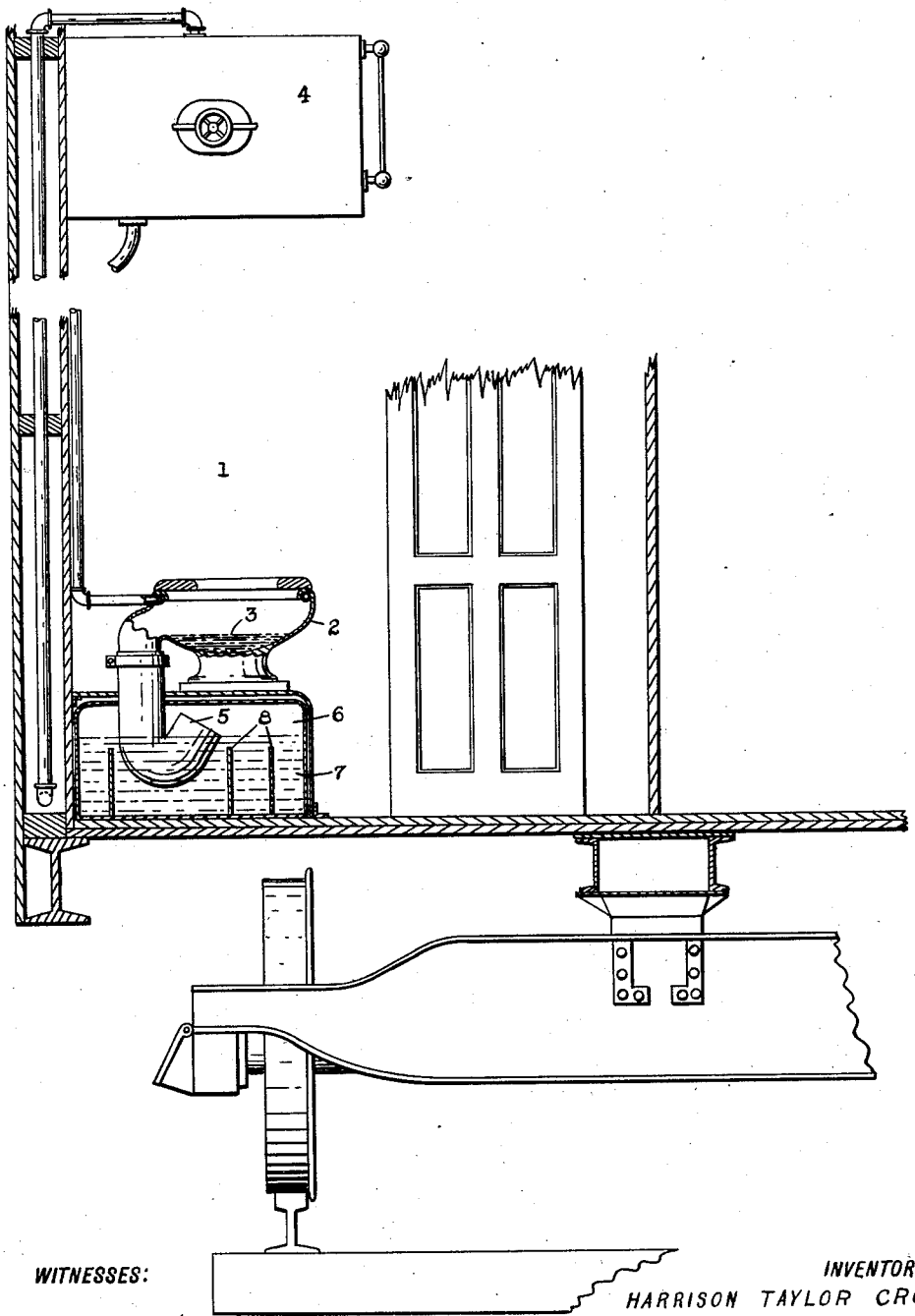
WITNESSES:
Howard P. King.
S. A. Thornton
INVENTOR:
HARRISON TAYLOR CRONK.
BY W. S. Orton.
ATTORNEY.

UNITED STATES PATENT OFFICE.

HARRISON TAYLOR CRONK, OF NEW YORK, N. Y., ASSIGNOR TO CRONK-SALTER COMPANY, OF NEW YORK, N. Y., A CORPORATION OF NEW YORK.

RAILROAD-CLOSET SANITATION.

1,097,003. Specification of Letters Patent. Patented May 19, 1914.

Application filed June 7, 1912. Serial No. 702,283.

*To all whom it may concern:*

Be it known that I, HARRISON TAYLOR CRONK, a citizen of the United States, residing in the city of New York, borough of Manhattan, county and State of New York, have invented certain new and useful Improvements in Methods of Railroad-Closet Sanitation, of which the following is a specification.

My invention relates to a method of sanitation and while the same may be of general application, it is specifically drawn to the prevention of infection from railroad and other peripatetic water-closets and toilets.

It is recognized that the road-beds, especially passing over watersheds, are a dangerous source of enteric infection due particularly to the prevalent system of distributing infected fecal and other matter along the right-of-way.

It has been suggested that the refuse matter on the trains be stored in a suitable closed receptacle and then destroyed under sanitary conditions and, it is with a device of this character that my method will be most efficacious. Even with a device of this character infection is likely to occur, first from the closet bowl itself, and secondly from the storage tank used. With the bowls now in general use, the opening of the trap permits an inrush of air forcing the more or less dried particles back into the room to be inhaled or to contaminate the clothing of the user, or, where the trap construction is not used, the remains from a previous evacuation is very apt to contaminate the air of the room. Further, the storage tanks when opened to discharge their contents, offer a source of danger to the cleaners, and the health departments of the cities recognize the danger of infection to the community from this source to such an extent that they will not permit the disposal of the contents into the city sewerage systems.

It is known that chemicals of various kinds designated as antiseptics or disinfectants have been introduced into the storing receptacle but that has the effect of merely covering the infected matter which, below the top layer thereof, retains its virulence and, in fact, the disease germs or bacteria grow under such conditions, the refuse and offal furnishing excellent food for their propagation and dissemination.

It will be understood that germs are living organisms producing toxins or poisons in the living hosts or the dead animal matter and, at the same time, using these subjects as foods. These organisms are immortal unless accidentally or purposely killed, and numerous methods are at present in vogue for accomplishing their destruction, such as the mechanical means for drying and crushing, thermic means for burning, baking, sterilizing and pasteurizing, or some process of disinfecting, the latter being the most convenient method in connection with the devices of a transitional character, such as form the subject-matter of this invention; besides, disinfectants possess ease, promptness and convenience of application and have proved to be of undoubted value in preventing sickness and disease.

Taking into consideration the status of the art as above outlined, I propose the use of a closet bowl so constructed that a bath of antiseptic fluid, such as dissolved chlorin, will be always disposed below the center of defilement and of such a depth that it will completely cover any matter, such as that from rectal abscess cancer, tubercular sputum, urine or feces, or even napkins, surgical dressings, sputum cups, infected rags, paper, etc., usually dumped into railroad closet bowls.

The chemical action of certain disinfectants is to coagulate albumen and albumin and it is in this process of coagulation that advantage is taken at this stage of the method. The bathing fluid coming into contact with the deposit causes a temporary protecting envelop or coating of coagula to form on the outside of the solid or rather relatively solid excreta or inserts, inclosing the more or less infectious center or mass within the coating of sterile matter including the dead germs and inactive toxins. Should the matter as thus treated be dumped on the road-bed or even into a container, the protecting envelop would eventually break exposing the inner core and presenting a source of infection as dangerous as if the matter had never been treated with the antiseptic bath.

By my improved method the matter with its temporary protecting coating is swept by a limited amount of flush water, preferably containing an antiseptic and under pressure, into a container or storing tank, which tank is in fluid communication but preferably separated by means of some approved form of water trap from the closet bowl. In the hermetically closed receptacle or tank thus arranged, the coated matter is broken or disintegrated by some approved means, such as the walls of the receptacle or splash plates therein, and the parts so disintegrated are subjected continually to the chemical action of an antiseptic contained in the flush water or carried by the storing tank itself. This action is facilitated by the rocking incidental to the moving railroad cars and the splash plates, or other disintegrating mechanism may be so arranged as to take advantage of this motion or they may have a motive power of their own. The object of this disintegration is to present the germs to the destroying action of the antiseptic, which antiseptic has but little penetrating power, as it must be made dilute so as not to form protecting scales or crusts, preventing it from acting on the infection which might be beneath the scales or crusts so formed. The matter itself must be broken up and practically placed in solution so that there may be a surface contact between the minute germ-cells and the active principle of the germicide forming the dissolving fluid.

A material amount of time is necessary to thoroughly disinfect the deleterious matter, as the limited amount of time during which the matter is in the closet bowl is not sufficient to render the same thoroughly innocuous, inoffensive and non-contagious; besides, any prolonged disintegrating action in the open bowl is very apt to liberate noxious gases, infected material and other offensive volatile matter. By my method this disintegration and disinfection takes place in a closed receptacle or tank in the continual presence of an antiseptic medium, so that at the end of a run or other prescribed times, the tank may be removed and the contents disposed of under approved sanitary conditions.

For the purpose of disclosing a form of apparatus which may be used in carrying out the novel process, reference is had to the accompanying drawing, the figure of which is a vertical sectional view through a toilet compartment on a railroad car.

In the drawings is shown a compartment 1 of a conventional form of railroad car within which compartment is mounted a closet bowl 2 adapted to contain an antiseptic solution 3, which may be contained in the flushing fluid fed from the usual flush water storage tank 4. The closet bowl 2 is in fluid communication through the trap 5 with the interior of the closed refuse storing tank 6, which tank contains an antiseptic or the antiseptic water 7 flushed from closet bowl. The tank and contents are subjected to the swaying action of the car while in motion and to assist in disintegrating the refuse matter splash plates 8 are positioned in the tank 6 so that the particles are gradually broken up by attrition as they flow against the splash plates and sides of the tank. It is of course obvious that this particular form of apparatus is not essential to the novel process defined in the claim.

Having thus described my invention, I claim as new and desire to secure by Letters Patent:

The process of disinfecting refuse material which consists in first subjecting the waste to the action of a disinfectant to coagulate the outer layer of particles of the matter to form a protecting envelop about the particles, and then inclosing the waste in a receptacle subjected to the swaying of a vehicle in motion, causing the gradual breaking up of the envelop about the particles by attrition as they flow against a relatively stationary body and simultaneously subjecting the matter which was within the envelop to the action of a weak disinfectant.

In testimony whereof I have signed my name to this specification in the presence of two subscribing witnesses.

HARRISON TAYLOR CRONK.

Witnesses:
 JOSEPH ISAACS,
 MILTON J. ISAACS.

---

Copies of this patent may be obtained for five cents each, by addressing the "Commissioner of Patents, Washington, D. C."